July 25, 1933.  C. I. McNEIL  1,920,096
CIRCUIT CONTROLLING MECHANISM
Filed May 25, 1932
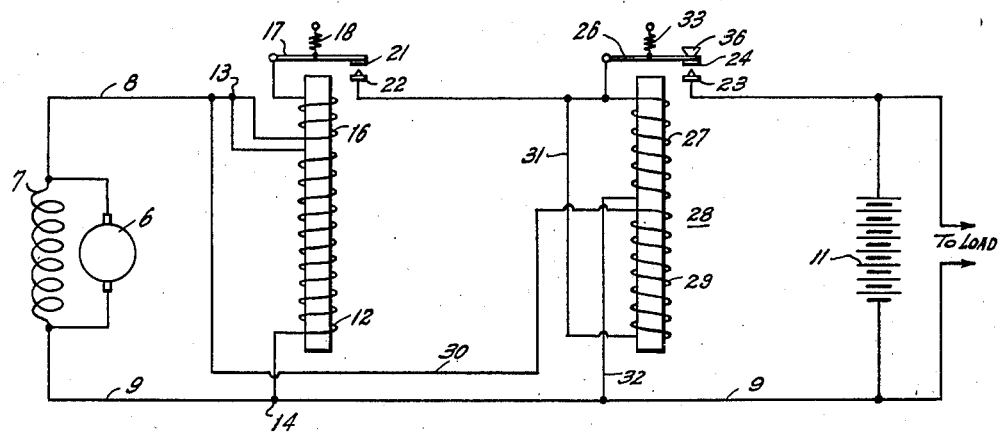
INVENTOR.
Charles I. McNeil
BY
Martin J. Finnegan
ATTORNEY.

Patented July 25, 1933

1,920,096

UNITED STATES PATENT OFFICE

CHARLES L. McNEIL, OF BLOOMFIELD, NEW JERSEY, ASSIGNOR, BY MESNE ASSIGN-
MENTS, TO ECLIPSE AVIATION CORPORATION, OF EAST ORANGE, NEW JERSEY, A
CORPORATION OF NEW JERSEY

CIRCUIT CONTROLLING MECHANISM

Application filed May 25, 1932. Serial No. 613,501.

This invention relates to circuit controlling mechanism, particularly to means for controlling the flow of current in a battery-generator circuit of the character employed to supply the current-consuming equipment of a motor vehicle, airplane, or other craft having a built-in power plant.

An object of the invention is to provide means whereby the operator of the craft may manually close or open the generator output circuit.

Another object of the invention is to provide means for effecting an automatic opening of said circuit whenever the generated voltage falls below a predetermined value.

The invention is herein shown applied to a system in which a reverse current relay is the instrumentality employed for automatically controlling the generator output circuit. A common fault of such relays has been that they are subject to be jarred closed when the generator voltage has dropped lower than their opening voltage, as for example when the aircraft is coming to a landing as the generator is operating at sub-normal speeds.

The present invention overcomes this difficulty by providing means whereby the operator may close the switch, of his own volition, but in conjunction with concurrently operable means acting automatically to open the charging circuit in the event of any tendency to jolt the reverse current relay to the circuit closing position at a time when it should remain open, thus relieving the operator of the necessity of manually opening the circuit in such event.

These and other objects and advantages of the invention will be more apparent from the following detailed description taken in connection with the accompanying drawing, wherein one embodiment of the invention is shown. It is to be expressly understood, however, that the drawing is for the purpose of illustration only, and is not designed as a definition of the limits of the invention, reference being had for this purpose to the appended claims.

The drawing is a diagrammatic representation showing the electrical relation of the novel combination of parts employed in the preferred embodiment.

Referring to the drawing, reference character 6 designates a generator having a shunt field as indicated at 7, adapted to connect the line conductors 8 and 9 with a battery to be charged, indicated diagrammatically at 11. Across the line conductors 8 and 9 is a winding 12 of a reverse current relay, the ends of which connect with the conductors 8 and 9, respectively, as indicated at 13 and 14, said winding 12 being adapted to cooperate with a second winding 16 to constitute the energizable element of the reverse current relay; the winding 16 being in series with the armature 17, and both windings acting when energized by a current flowing in the proper direction, to hold the contacts 21 and 22 closed against the tension of the spring 18 which would otherwise hold these contacts open. As shown, contacts 21 and 22 constitute one break in the line 8, and cooperate with a second break in said line; the control of the latter being a principal feature of the invention now to be described.

The second break in the line 8 occurs by reason of the open contacts 23 and 24, the latter being mounted on an armature 26 adapted to be influenced by energization of the winding 27 of a novel solenoid or relay 28, the winding 27 being associated with a second oppositely directed winding 29 also provided on the solenoid 28 and electrically shunted across the contacts 21 and 22; one end of the winding 29 being connected with the line 8 by means of the conductor 30, and the other end by the conductor 31. The completion of the shunt circuit through the winding 27 is effected by the provision of a second conductor 32, connecting the winding 27 with the generator return feed 9. A spring 33 is provided to open contacts 23 and 24 when the winding 29 is energized sufficiently to substantially neutralize the magnetic influence of the winding 27. Initial closure of the switch is effected by the manual means indicated at 36.

Having thus described the parts enter- ing into the invention, the operation thereof will be seen to be as follows:

Contacts 23 and 24 of the relay 28 are closed manually by push key 36, thereby closing or at least reducing the length of the air gap between armature 26 and the core of the relay. Assuming the generator is operating at normal voltage, the contacts 21 and 22 of the reverse current relay have been closed by the magnetic action of winding 12. Winding 27 is now excited by the generator voltage and is of such strength as to hold armature 26 closed against the pull of spring 33. The generator is thus connected to the battery and load circuits. Upon the dropping of the generator voltage below a predetermined value, the contacts 21 and 22 will be opened by the spring 18, due to the substantial weakening of the magnetic field acting on armature 17. Now since the battery voltage is still effective across the winding 27, the difference in potential between battery and generator produces a voltage across the coil 29, and since the latter is so connected that its magneto-motive force opposes the magneto-motive force of coil 27, the resulting substantial neutralization of the pull on armature 26 renders the spring 33 effective to open contacts 23 and 24. Accordingly, even though there should be a severe jolt of the craft causing the contacts 21 and 22 to be jarred to the closed position there will be no connection established between the generator and the battery. Thus any possibility of an electrical weld of the contacts 21 and 22 is avoided.

In the accompanying drawing no attempt has been made to show other auxiliary apparatus, such as voltage and current regulators, which it may be desirable to employ in certain installations in conjunction with the novel features of the present invention above described. It is accordingly to be understood that the particular electrical connections and relationship of parts herein shown are not intended to exclude the addition of such other devices to supplement their operation, and the invention is accordingly intended to cover any installation embodying the essential features as above described and as expressed in the broadest of the appended claims.

My copending application Serial Number 481,755 filed September 13, 1930, discloses and claims an output control system involving a combination of relays, one of which is responsive to a reversal of current as in the present invention, and reference is therefore to be had to said copending case for claims to such combination broadly considered; the claims herein being directed to a modification in which the electrical relationship between the reverse current controlled switch and the relay controlling the second switch differs from that indicated in said copending application.

What is claimed is:

1. In a device of the class described, in combination with a generator and a battery both connected across a main circuit adapted to feed an external load, a reverse current controlled switch located in said main circuit, a manually closable switch in series with said first named switch and control means responsive to an opening of said first named switch to operate upon said second switch for maintaining said circuit open as long as the generator voltage remains below the predetermined value at which said first named switch is opened, said control means comprising a solenoid having opposing windings, one of which tends to close said switch and the other of which tends to render the first ineffective, said last named winding being in shunt with said first named switch.

2. In a device of the class described, in combination with a generator and a battery both connected across a main circuit adapted to feed an external load, a reverse current controlled switch located in said main circuit, a closable switch in series with said first named switch and control means responsive to an opening of said first named switch to operate upon said second switch for maintaining said circuit open as long as the generator voltage remains below the predetermined value at which said first named switch is opened, said control means comprising a solenoid having opposing windings, one of which tends to close said switch and the other of which tends to render the first ineffective, said last named winding being in shunt with said first named switch, and resilient means for reopening said second switch when the potential difference across said second winding is sufficient to neutralize the magnetomotive force of said first named winding.

CHARLES I. McNEIL.